(12) United States Patent
Nakayama

(10) Patent No.: US 6,213,573 B1
(45) Date of Patent: Apr. 10, 2001

(54) RUBBER PADS

(75) Inventor: Koji Nakayama, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/259,301

(22) Filed: Mar. 1, 1999

(30) Foreign Application Priority Data

Mar. 1, 1998 (JP) ................................. 10-066203

(51) Int. Cl.⁷ ........................ B62D 55/20; B62D 55/28; B62D 55/88; B62D 55/26; B62D 55/275
(52) U.S. Cl. .................. 305/51; 305/188; 305/111; 428/99
(58) Field of Search ................................. 305/111, 113, 305/114, 185, 46, 51, 187, 188, 189, 200, 201, 191; 428/99

(56) References Cited

U.S. PATENT DOCUMENTS

| | | |
|---|---|---|
| 2,404,488 | 7/1946 | Hait .......................... 115/1 |
| 2,869,932 | 1/1959 | Eichweber .................. 305/10 |
| 3,232,679 * | 2/1966 | Katzenberger ............... 305/13 |
| 3,504,951 | 4/1970 | Hirych ....................... 305/11 |
| 3,973,807 | 8/1976 | Korner et al. ............... 305/40 |
| 5,388,900 | 2/1995 | Suzuki ....................... 305/54 |
| 5,630,657 | 5/1997 | Kumano et al. ............. 305/46 |
| 5,685,620 | 11/1997 | Bertoni ....................... 305/46 |

FOREIGN PATENT DOCUMENTS

| | | |
|---|---|---|
| 579211 | 1/1994 | (EP) . |
| 764573A1 | 3/1997 | (EP) . |
| 56-164878 | 12/1981 | (JP) . |
| 5-82776 | 11/1983 | (JP) . |
| 6-10088 | 2/1994 | (JP) . |
| 8-119163 | 5/1996 | (JP) . |
| 8-244659 | 9/1996 | (JP) . |
| 8-282559 | 10/1996 | (JP) . |
| 9-95267 | 4/1997 | (JP) . |
| 9-136678 | 5/1997 | (JP) . |
| 10016837 * | 1/1998 | (JP) . |
| 11-139363 | 5/1999 | (JP) . |
| 1404402 | 6/1988 | (SU) . |

* cited by examiner

Primary Examiner—Ellis Robinson
Assistant Examiner—Alicia Chevalier
(74) Attorney, Agent, or Firm—Sughrue, Mion, Zinn, Macpeak & Seas, PLLC

(57) ABSTRACT

A rubber pad comprises a support plate having substantially the same shape as an outer surface of an iron shoe plate provided on its outer surface with lugs, a rubber block vulcanized and adhered to the support plate, wherein the support plate is provided with a bolt or a female member fixed to at least one side face of the support plate, a hook member fixed to the support plate at a position opposite to the bolt or female member. Further, the rubber pad is provided with a fastening member securing the rubber pad to the iron shoe plate through another female member or bolt.

9 Claims, 16 Drawing Sheets

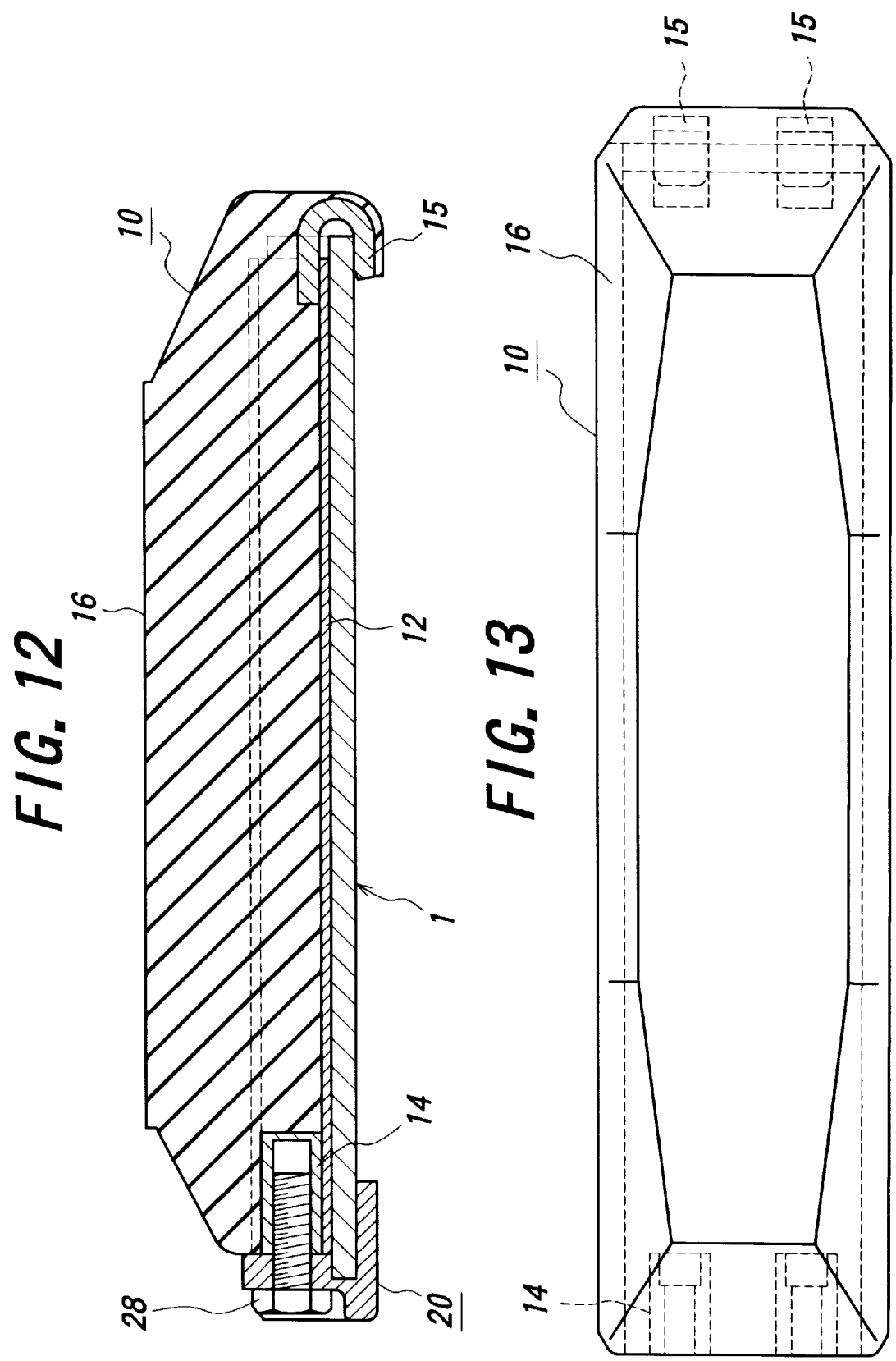

RUBBER PADS

BACKGROUND OF THE INVENTION

1. Field of the Invention

This invention relates to a rubber pad post-fitted to an iron shoe crawler.

2. Description of Related Art

Recently, a shoe pad is widely used in a traveling portion of a construction machine, earth-moving machine or the like. Since the shoe pad is formed by covering an iron shoe plate fixed to a link with a rubber pad, there are many advantages in that the shoe pad does not damage the road surface, and vibrations transmitted to an operator are reduced, and the like. Furthermore, if the rubber pad is broken, only the broken rubber pad is replaced with a new rubber pad.

In general, the rubber pad is fixed to the iron shoe plate by utilizing a bolt produced from the rubber pad through a nut. However, it is difficult to attach the rubber pad to the iron shoe plate at a state of fixing the iron shoe plates to a machine body. Also, the detachment of the nut from the bolt becomes frequently difficult.

Particularly, it is difficult to conduct the attachment or detachment between the bolt and the nut at the inside of the machine body and also it is difficult to remove the rubber pad from the iron shoe plate in the replacement of the broken rubber pad. Thus, there is a need to facilitate the replacing operation. Because, the attaching or detaching operation between the bolt and the nut must be carried out at a narrow space, and further substantial labor is taken in the operation of removing mud and the like from the nut potion before the detachment of the nut.

Additionally, a mudhole is formed in the iron shoe plate between lugs of the plate. The mudhole is a path of removing mud that has invaded into a back face of the shoe plate. When the rubber pad having no mudhole is fixed to such an iron shoe plate, a support plate for the rubber pad is deformed by an invasion force of mud into the back face of the shoe plate, so that the combination of the shoe plate and the rubber pad does not come into a practical use.

SUMMARY OF THE INVENTION

It is, therefore, an object of the invention to solve the aforementioned drawback of the conventional technique and to provide a rubber pad capable of reducing vibrations transmitted to an operator without damaging a road surface and attaching or detaching to an iron shoe plate without causing deformation of a support plate for the rubber pad through mud, small stones and the like invaded from a mudhole of the shoe plate.

According to a first aspect of the invention, there is the provision of a rubber pad comprising a support plate having substantially the same shape as an outer surface of an iron shoe plate provided on its outer surface with lugs, a rubber block vulcanized and adhered to the support plate and having substantially the same shape as the outer surface of the iron shoe plate, a bolt or a female member fixed to at least one side face of the support plate, an idle hole formed on a side face of tho rubber block at a position corresponding to the bolt or female member, a hook member fixed to the support plate at a position opposite to the bolt or female member and provided with a flange extending toward an inner face of the iron shoe plate, and a fastening member securing the rubber pad to the iron shoe plate through another female member or bolt.

In a preferable embodiment of the first aspect of the invention, the fastening member is provided with a counterboring portion for the bolt or female member.

In another preferable embodiment of the first aspect of the invention, the fastening member is provided with a flange having a length enough to engage with the inner face of the iron shoe plate.

In the other preferable embodiment of the first aspect of the invention, at least a part of an engaging portion of the hook member with one end portion of the iron shoe plate is coated with a rubbery elastomer. In this case, a thickness of the rubbery elastomer is gradually increased toward an engaging end of the hook member.

According to a second aspect of the invention, there is the provision of a rubber pad comprising a support plate having substantially the same shape as an outer surface of an iron shoe plate provided on its outer surface with lugs and a mudhole formed in a portion between the lugs, a rubber block vulcanized and adhered to the support plate and having substantially the same shape as the outer surface of the iron shoe plate, in which a recess portion communicating with the mudhole is formed in the support plate so as to extend in a direction perpendicular to the mudhole and toward the outside of the support plate.

According to a third aspect of the invention, there is the provision of a rubber pad comprising a support plate having substantially the same shape as an outer surface of an iron shoe plate provided on its outer surface with lugs and a mudhole formed in a portion between the lugs, a rubber block vulcanized and adhered to the support plate and having substantially the same shape as the outer surface of the iron shoe plate, in which a hooking member is secured to a convex portion of the support plate at a position corresponding to the mudhole so as to engage with an edge portion of the mudhole.

In a preferable embodiment of the third aspect of the invention, a protruding portion is formed on a side face of the convex portion of the support plate in a direction opposite to an extending direction of a top of the hooking member.

According to a fourth aspect of the invention, there is the provision of a rubber pad comprising a support plate having substantially the same shape as an outer surface of an iron shoe plate provided on its outer surface with lugs, a rubber block vulcanized and adhered to the support plate and having substantially the same shape as the outer surface of the iron shoe plate, cap nuts welded to the iron shoe plate at given positions and embedded in the rubber block, a female member fixed to an end of the support plate, a hook member fixed to the other end of the support plate provided with a flange extending toward an inner face of the iron shoe plate, and a fastening member securing the rubber pad to the iron shoe plate through a male member.

In the rubber pad according to the invention having the aforementioned structure, the attachment or detachment of the rubber pad to the iron shoe plate is carried out in a wider operating space located at a side of a machine body securing the iron shoe plates, so that the operation of attaching or detaching the rubber pad becomes very easy. Particularly, the rubber block attached to the iron shoe plate through the hook member is secured to the iron shoe plate with the fastening member, so that the operation in the attachment of the rubber pad is improved. Also, when a load is applied to the rubber pad during the traveling of the machine body, or when the fastening member is pushed to a curbstone or rides thereover, looseness or clattering is not caused between the rubber pad and the iron shoe plate to prevent the separation of the rubber pad from the iron shoe plate.

Since the fastening member is provided with the counterboring portion, a head of the nut or bolt for securing the fastening member to the rubber block is housed in the counterboring portion to prevent the contact with stones or curbstones, so that the looseness, clattering or deformation of the bolt or nut is not caused and hence there is caused no inconvenience that it is impossible to detach the bolt or nut in the replacement thereof. Furthermore, the fastening member is provided with the flange having a length sufficient to engage with the inner face of the iron shoe plate, so that a gouging angle to the curbstone can be reduced when the fastening member rides on the curbstone and hence the looseness or deformation of the bolt or nut can be prevented to control the falling off of the rubber pad.

Particularly, when the hook member welded to the support plate in the rubber pad is located toward the inside of the machine body in the attachment to the iron shoe plate, the attaching operation is very easy to facilitate the replacement of the rubber pad to the iron shoe plate.

The term "female member" used herein means not only the cap nut but also female screwed (rod-shaped) fittings.

At least a part of the engaging portion of the hook member with one end portion of the iron shoe plate is coated with the rubbery elastomer so as to gradually increase the thickness of the rubbery elastomer toward the engaging end of the hook member. Therefore, the iron shoe plate is interposed into the engaging portion of the hook member while compressing the rubbery elastomer, so that there is no looseness of the iron shoe plate due to vibration, external force or the like in use.

The rubbery elastomer may be applied to a full surface of the engaging portion of the hook member. Moreover, it is favorable that the rubber elastomer is simultaneously formed at the time of vulcanizing and adhering the rubber block to the iron shoe plate. In this case, a slant space is formed in a mold for shaping the rubber pad at a position corresponding to the engaging portion and a tapered rubbery elastomer is formed in such a space by utilizing the fluidity of the uncured rubber.

When the mudhole extending outward in a direction perpendicular to the mudhole formed in the iron shoe plate is formed in the support plate of the rubber pad, so that mud or small that have invaded into the iron shoe plate are removed toward the outside of the rubber pad through the mudholes. Therefore, there are merits that the mudhole facing the road surface is not formed in the rubber block and the rubber block in the rubber pad is not deformed.

Furthermore, the hooking member is secured to the convex portion of the support plate at a position corresponding to the mudhole formed in the iron shoe plate so as to engage with an edge portion of the mudhole, whereby the rubber pad can strongly be fixed to the iron shoe plate. In this case, the mudhole badly exerting upon the rubber pad is inversely utilized for the fixation of the rubber pad.

Preferably, the protruding portion is formed on a side face of the convex portion of the support plate in the direction opposite to the extending direction of the top of the hooking member, whereby the movement of the rubber pad in front and back directions is controlled after the attachment of the rubber pad to the iron shoe plate. In case of using only the hooking member, the rubber pad may be moved in the front and back directions due to the pressure of mud invaded from the mudhole to finally cause the falling off or deformation of the rubber pad. When the hooking member is used together with the protruding portion, the convex portion of the support plate is rigidly housed between the lugs of the iron shoe plate to cause no movement in the front and back directions.

As mentioned above, the rubber pad is attached to the iron shoe plate through the hook member welded to the support plate, female member and fastening member irrespectively of the presence or absence of bold hole formed in the iron shoe plate. Moreover, when the bolt hole is formed in the iron shoe plate, it is naturally possible to attach the rubber pad according to the invention by utilizing this bolt hole. In this case, the attachment of the rubber pad to the iron shoe plate is more strongly and completely attained by screwing a bolt through the bolt hole into a cap nut welded to the support plate in addition to the hook member and the fastening member.

BRIEF DESCRIPTION OF THE DRAWINGS

The invention will be described with reference to the accompanying drawings, wherein:

FIG. 12 is a diagrammatically section view illustrating a main part of the rubber pad attached to the iron shoe plate according to the invention;

FIG. 13 is a plan view of the rubber pad shown in FIG. 12 according to the invention;

DESCRIPTION OF THE PREFERRED EMBODIMENTS

Figure 1:
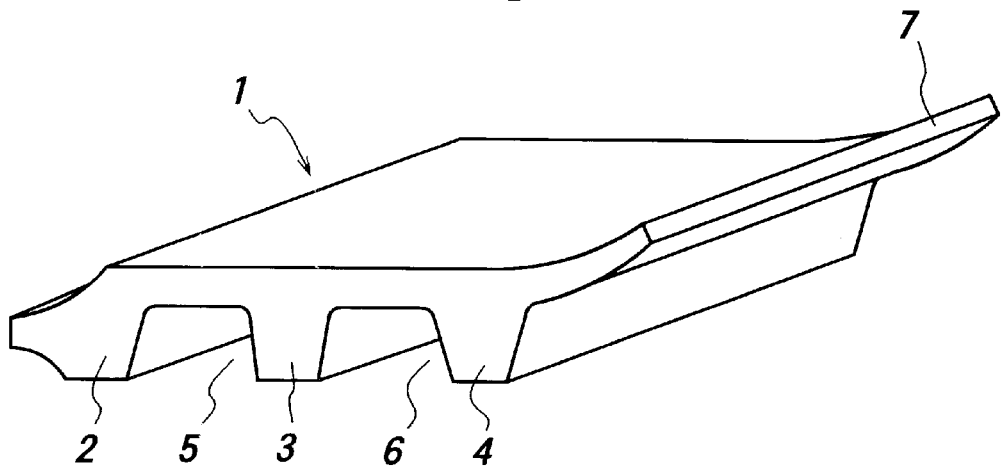
FIG. 1 is a perspective view of a first embodiment of the iron shoe plate used in the crawler according to the invention.

In FIG. 1 is perspectively shown an iron shoe plate 1 to be used in a crawler according to the invention. The iron shoe plate 1 is provided on its outer surface with three lugs 2, 3, 4 and two groove portions 5, 6 formed between the lugs. Numeral 7 is a fin.

Figure 2:
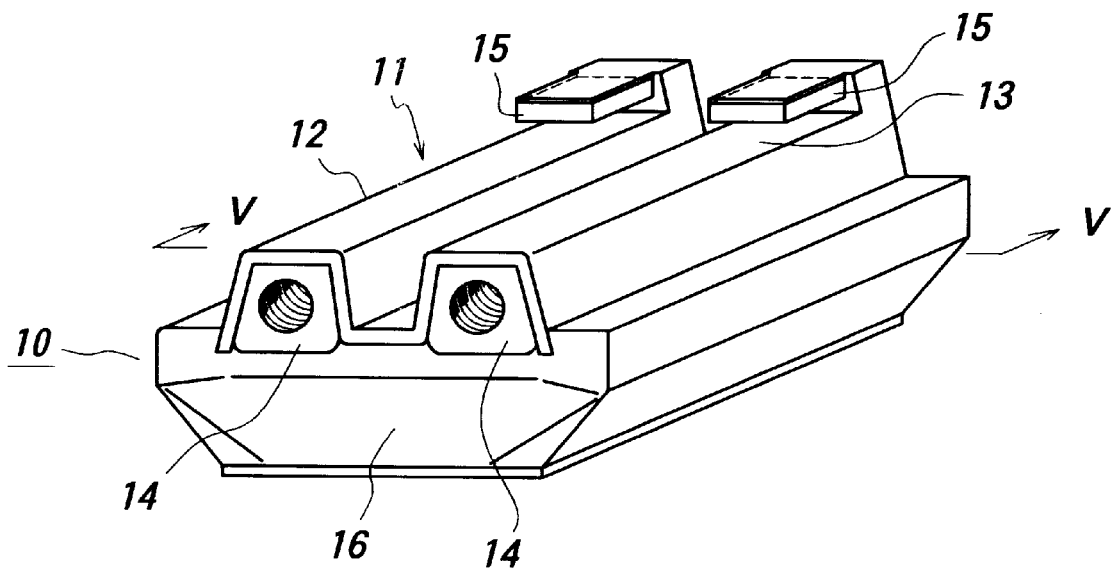
FIG. 2 is a perspective view of a first embodiment of the rubber pad according to the invention.
Figure 3:
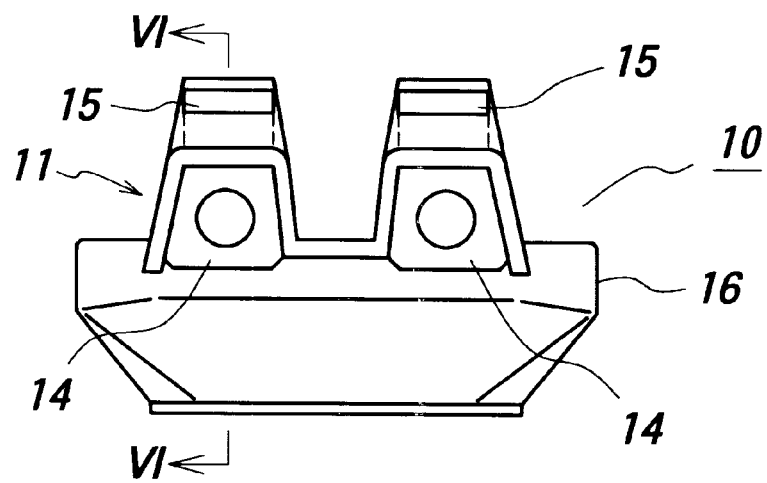
FIG. 3 is a left side view of the rubber pad shown in FIG. 2.
Figure 4:
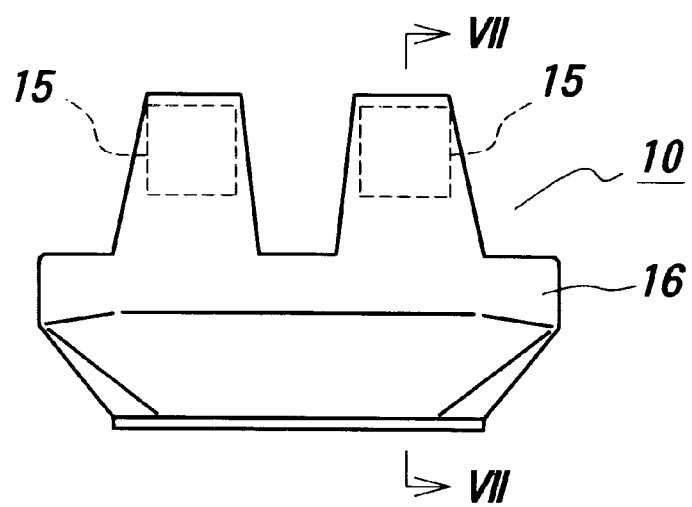
FIG. 4 is a right side view of the rubber pad shown in FIG. 2.
Figure 5:
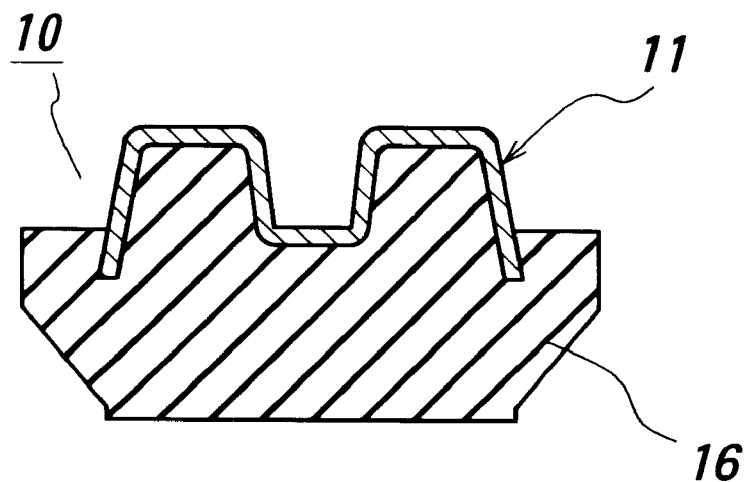
FIG. 5 is a diagrammatically section view taken along a line V—V in FIG. 2.
Figure 6:
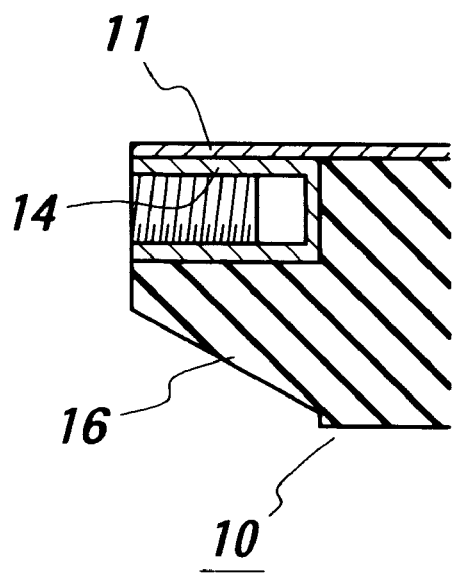
FIG. 6 is a diagrammatically section view taken along a line VI—VI in FIG. 3.
Figure 7:
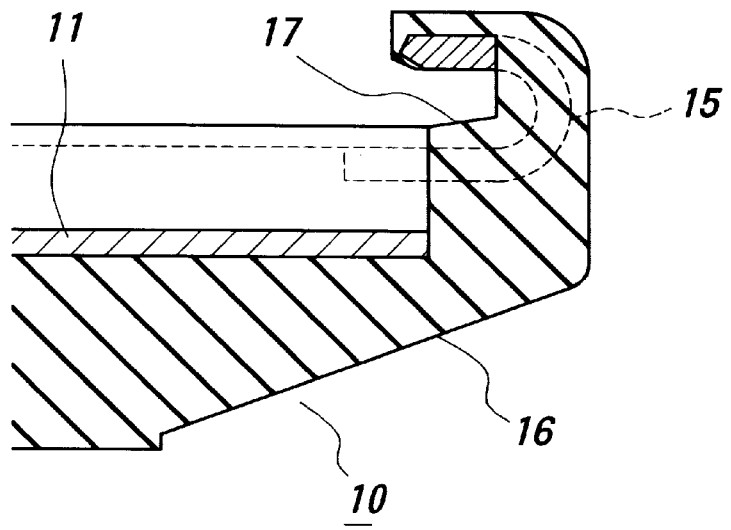
FIG. 7 is a diagrammatically enlarged section view taken along a line VII—VII in FIG. 4.

In FIG. 2 is perspectively shown a rubber pad 10 according to the invention to be attached to the outer surface of the iron shoe plate 1. FIG. 3 is a left side view of the rubber pad 10, FIG. 4 is a right side view thereof, FIG. 5 is a section view taken along a line V—V in FIG. 2, FIG. 6 is a section view taken along a line VI—VI in FIG. 3, and FIG. 7 is a section view taken along a line VII—VII in FIG. 4. In these figures, numeral 11 is a support plate, which has convex portions 12, 13 each having substantially the same shape as the groove portion 5, 6 defined between the lugs 2, 3, 4. In the illustrated embodiment, a female member 14 is welded to each inner face of the convex portions 12, 13 at a left-side end zone thereof, while a hook member 15 is welded to each inner face of the convex portions 12, 13 at a right-side end zone thereof. A rubber block 16 having a given shape is adhered to the support plate 11 inclusive of he female member 14, and the hook member 15 by vulcanization in a mold (not shown). The hook member 15 is hooked onto an inner surface of the iron shoe plate 1 at a position corresponding to an inside of a machine body (not shown).

Figure 8:
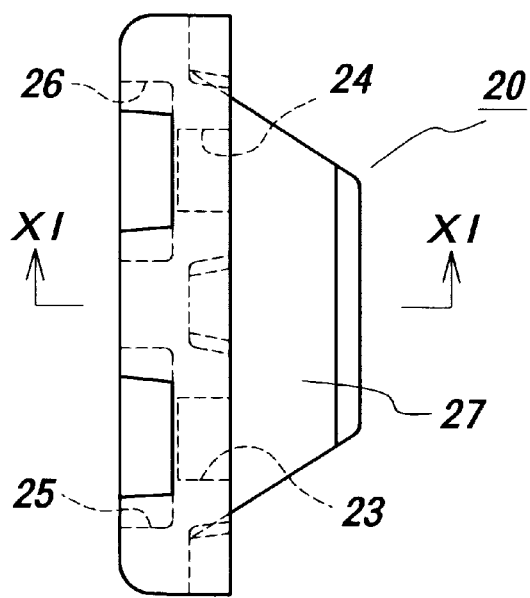
FIG. 8 is a plan view of an embodiment of the fastening member used in the rubber pad according to the invention.
Figure 9:
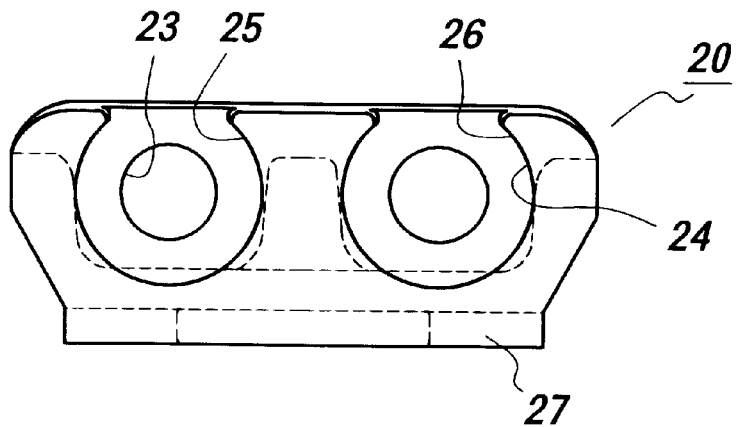
FIG. 9 is a left side view of the fastening member shown in FIG. 8.
Figure 10:
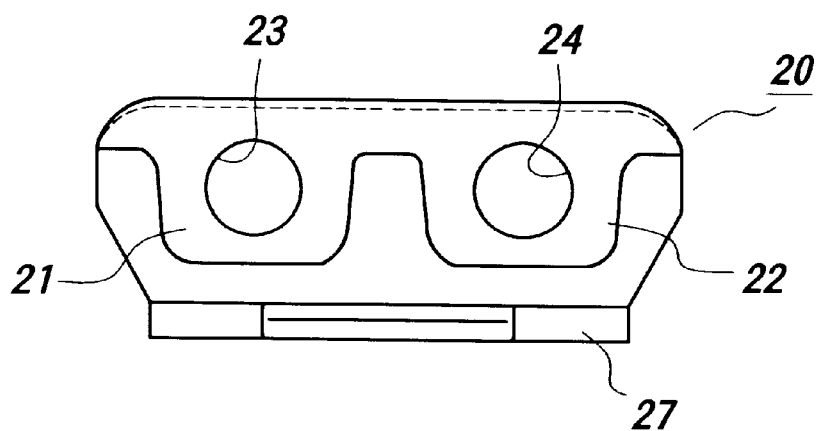
FIG. 10 is a right side view of the fastening member shown in FIG. 8.
Figure 11:
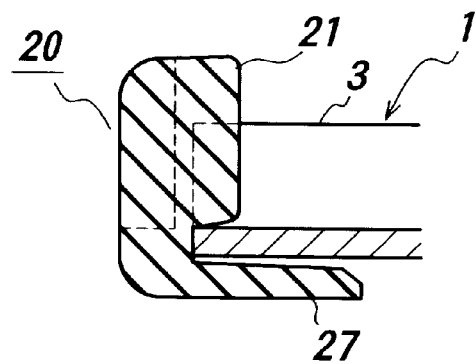
FIG. 11 is a diagrammatically section view taken along a line XI—XI in FIG. 8.

A fastening member 20 is shown as a plan view in FIG. 8, as a left side view in FIG. 9, as a right side view in FIG. 10 and as a section view taken along a line XI—XI of FIG. 8 in FIG. 11, respectively. The fastening member 20 has substantially the same shape as the outer surface of the iron shoe plate 1 or has convex portions 21, 22 corresponding to the groove portions 5,6 of the iron shoe plate 1 and idle holes 23, 24 corresponding to the holes of the female members 14 for passing bolts (not shown). The counterboring portions 25, 26 are formed at positions around the idle holes 23, 24 so as to house a head of a bolt (or nut) therein for protection from an external force. Furthermore, the fastening member 20 is provided with a flange portion 27 having a length enough to engage with the inner face of the iron shoe plate 1.

In FIG. 12 is sectionally shown a main part of a shoe pad formed by attaching the rubber pad 10 shown in FIG. 2 to the iron shoe plate 1 shown in FIG. 1 and fixing them with the fastening member 20 through a bolt 28. In this case, the hook member 15 located at one end of the rubber pad 10 is first engaged with an end at the inner face of the iron shoe plate 1 and further the convex portions 12, 13 are placed into the respective groove portions 5, 6 of the iron shoe plate 1. Then, the fastening member 20 is contacted with the end faces of he female members 14 so as to place the convex portions 21, 22 into the groove portions 5, 6 and contact the flange portion 27 with the other end at the inner face of the iron shoe plate 1, and fixed to the rubber pad 10 through the bolts 28. The heads of the bolts 28 are housed in the counterboring portions 25, 26. Moreover, it is preferred that a gap of about 1 mm is formed between the flange portion 27 and the inner face of the iron shoe plate 1 from a viewpoint of mechanical strength.

Although the bolt 28 is screwed into the female member (e.g. cap nut) welded to the support plate 12 in the illustrated embodiment, a bolt may be welded to the support plate and screwed by a nut at subsequent step.

Figure 14:
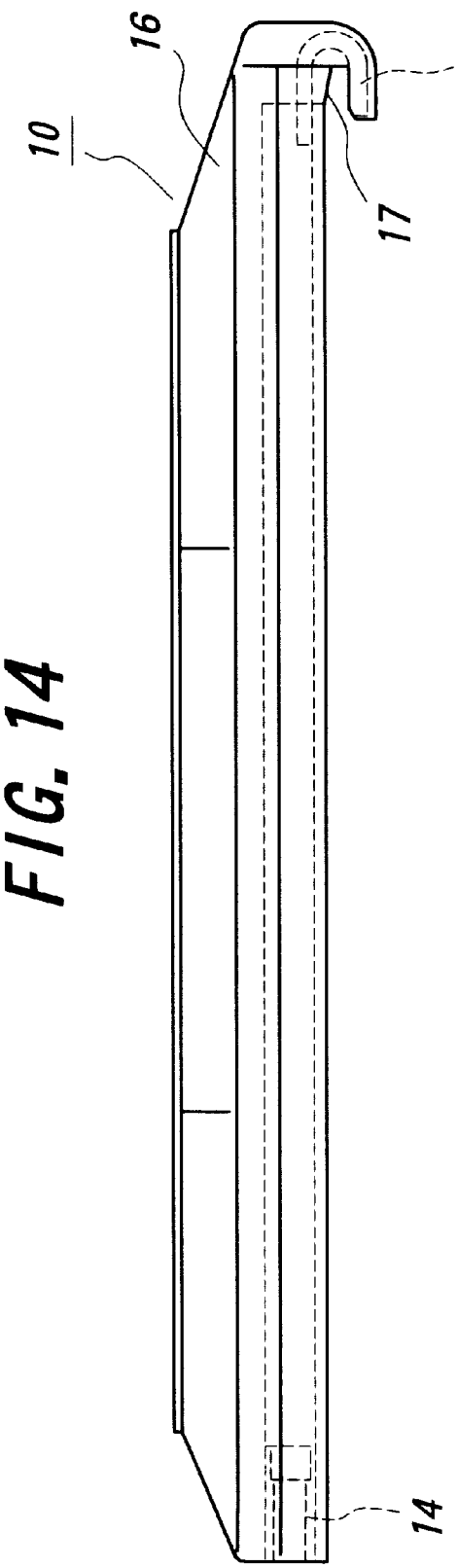
FIG. 14 is a front view of the rubber pad shown in FIG. 13.

The rubber pad 10 shown in FIG. 2 according to the invention is shown as a plan view in FIG. 13 and as a front view in FIG. 14. As shown in FIGS. 2 to 7, the rubber block 16 is adhered by vulcanization to the outer surface of the support plate 11 having substantially the same shape as the grouser portion of the iron shoe plate 1. The hook member 15 is welded to each inner face of the convex portion 12, 13 at a right side end of the support plate 11 and the thus welded portion is embedded in the rubber block 16. On the other hand, the female member 14 is welded to each inner face of the convex portions 12, 13 at a left side end of the support plate 1 and is covered with the rubber block 16.

When the hook member 15 is engaged with the one end portion of the iron shoe plate 1 and the rubber pad 10 is secured to the iron shoe plate 1 with the fastening member 10 and the bolt 28 as shown in FIG. 12, there may be caused a gap or clattering due to the friction based on the contact of the metallic parts between the engaging portion of the hook member 15 and the end portion of the iron shoe plate 1. For this end, according to the invention, as shown in FIG. 7, a rubbery elastomer 17 is adhered by vulcanization to at least a part of the engaging portion of the hook member 15 at a side contacting with the end portion of the iron shoe plate 1. In this case, it is preferable that the rubber elastomer 17 is tapered toward the engaging end portion of the hook member 15 to facilitate the insertion of the iron shoe plate 1 into the engaging portion. As a result, the friction based on the contact of the metal parts is not caused owing to the presence of the rubber elastomer 17 between the metal parts, and also the gap or clattering between the iron shoe plate 1 and the hook member 15 is prevented by the resilient force of the rubber elastomer 17. Moreover, the rubbery elastomer 17 may be adhered over a full area of the engaging portion of the hook member 15.

Figure 15:
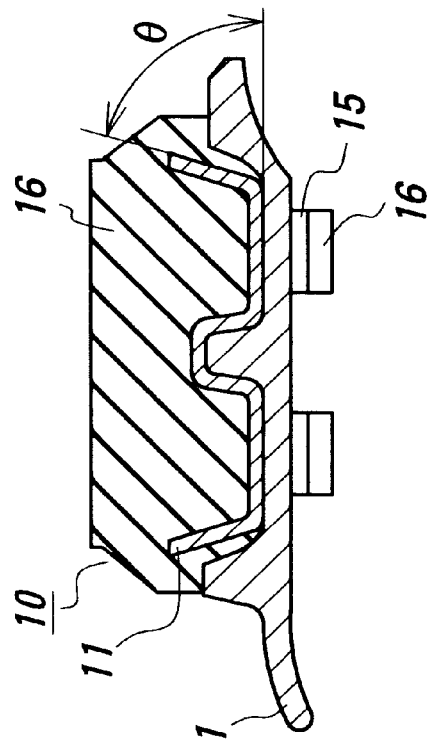
FIG. 15 is a diagrammatically section view of a modified embodiment of the rubber pad shown in FIG. 12.

In FIG. 15 is shown a modified embodiment of the rubber pad shown in FIG. 12, wherein both end portions of the support plate 11 are made higher than a height of a lug of the iron shoe plate 1 and embedded in the rubber block 16. Thus, the strength of the support plate 1 is increased and also strain produced in the rubber block adhered to the free ends of the support plate 1 becomes small to reduce the occurrence of peeling at the adhesion interface between the plate 11 and the rubber block 16 due to shearing strain. As shown in FIG. 15, an inclination angle θ of each of both end portions of the support plate 11 is made larger than an inclination angle of a lug located at front and read sides of the iron shoe plate 1. A portion of the rubber block 16 is sandwiched between the inclination faces of the end portion of the support plate and the lug of the iron shoe plate while covering the free ends of the support plate 11. In this case, the rubber quantity is increased, so that the concentration of strain in the free end of the support plate from a road surface is mitigated during the travelling of the machine body or the attachment or detachment operation of the rubber pad and hence the breakage or peeling of the rubber pad is controlled to improve the durability of the rubber pad.

Figure 16:
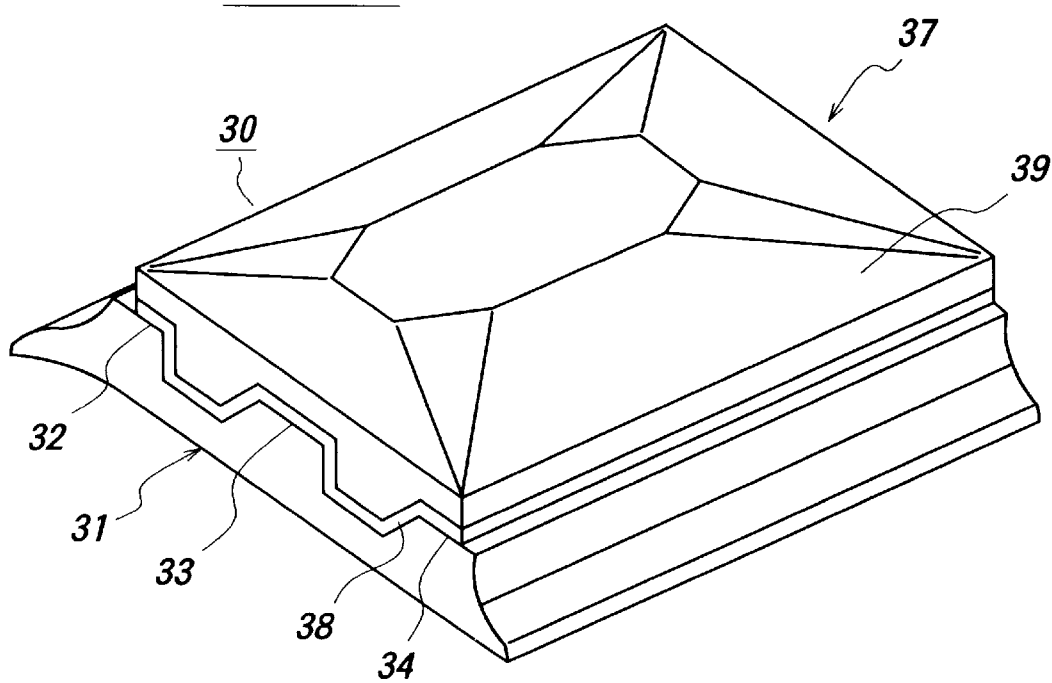
FIG. 16 is a perspective view of an embodiment of the elastic shoe used in the conventional crawler.
Figure 17:
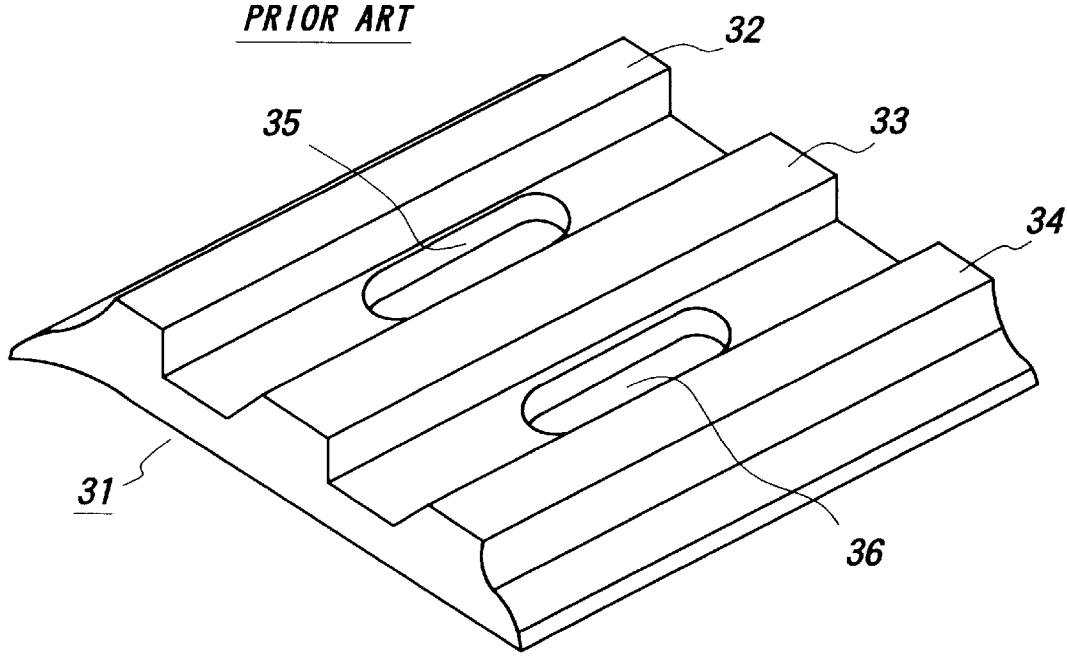
FIG. 17 is a perspective view illustrating only an iron shoe plate taken out from the elastic shoe of FIG. 16.

In FIG. 16 is perspectively shown another embodiment of the shoe pad (30) used in the conventional crawler and only an iron shoe plate (31) taken out from the shoe pad of FIG. 16 is perspectively shown in FIG. 17. The iron shoe plate 31 is provided on its tread side with three lug portions 32, 33, 34 extending in its longitudinal direction, and mudholes 35, 36 are formed in valley portions define between the lug potions 32, 33, 34. A rubber pad 37 to be fixed to the tread side of the iron shoe plate 31 comprises a support pate 38 having substantially the same shape as in the tread side of the iron shoe plate 31 and a rubber block 39 adhered by vulcanization to an outer surface of the support plate 38. The rubber pad 37 and the iron shoe plate 31 are fixed to each other through bolts and nuts (not shown) to form the shoe pad 30.

Figure 18:
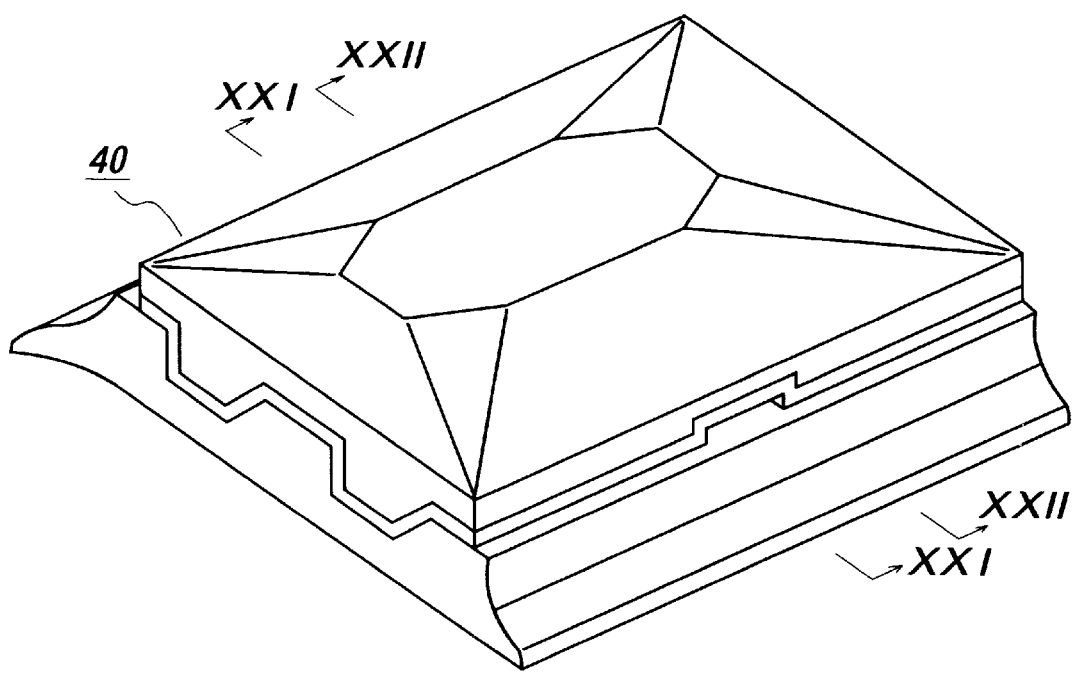
FIG. 18 is a perspective view of an embodiment of the elastic shoe used in the crawler according to the invention.
Figure 19:
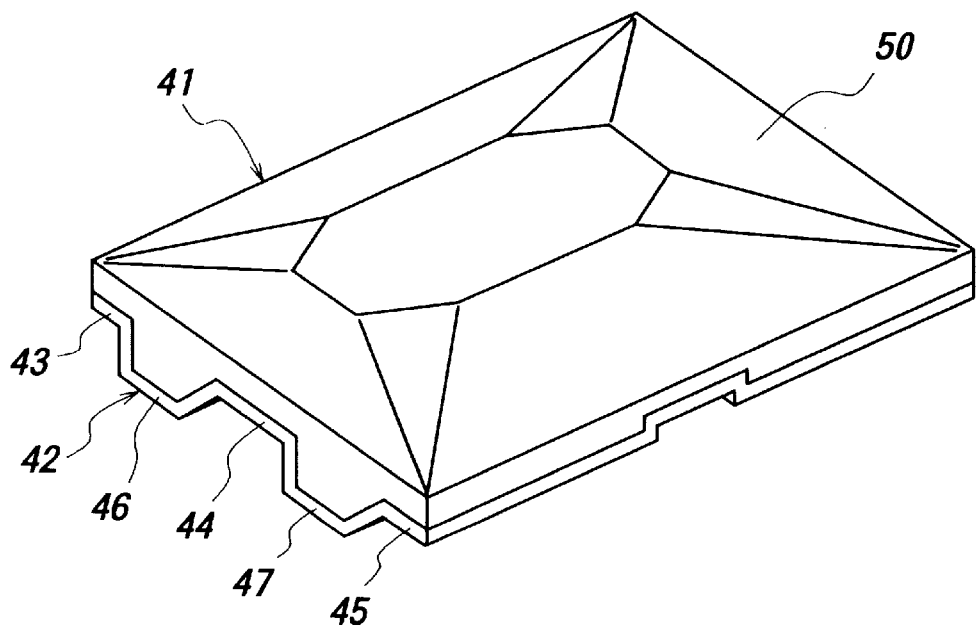
FIG. 19 is a perspective view illustrating only a rubber pad taken out from the elastic shoe of FIG. 18.
Figure 20:
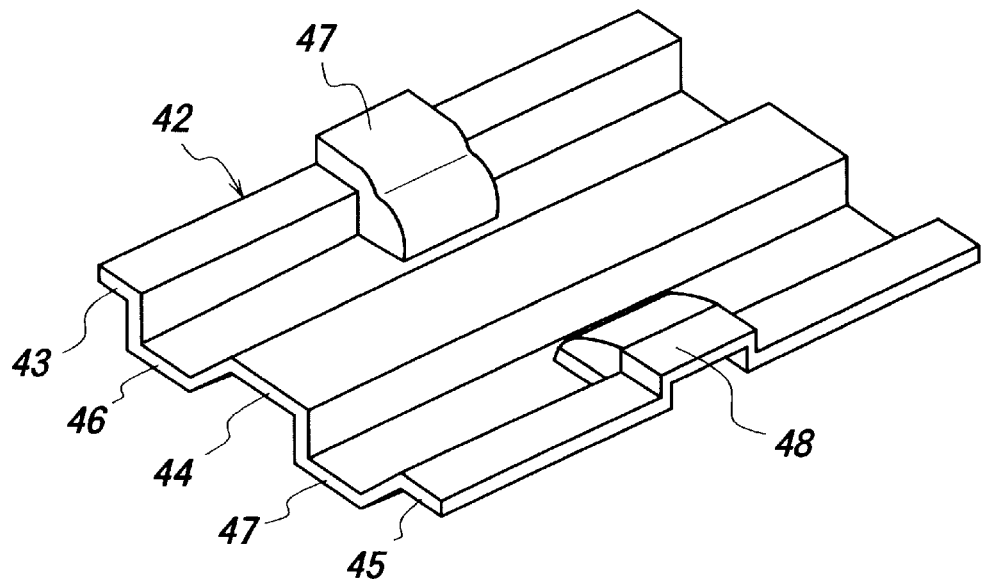
FIG. 20 is a perspective view illustrating only a support plate taken out from the rubber pad of FIG. 19.

In FIG. 18 is perspectively shown a shoe pad 40 according to the invention, which is a modified embodiment of the shoe pad 30 shown in FIG. 16. FIG. 19 is a perspective view illustrating only a rubber pad 41 taken out from the shoe pad 40, and FIG. 20 is a perspective view illustrating only a support plate 42 taken out from the rubber pad 41. Moreover, an iron shoe plate constituting the shoe pad 40 is the same as shown in FIG. 17.

In the rubber pad 41 according to the invention, the iron shoe plate 42 is provided with concave portions 43, 44, 45 at positions corresponding to the lug portions 32, 33, 34 of the iron shoe plate 31 and convex portions 46, 47 at positions corresponding to the valley portions of the iron shoe plate 31. Furthermore, depression portions (or mudholes) 48, 49 are formed in the convex portion 46, 47 and concave portion 43, 45 of the support plate 42 at positions corresponding to the mudholes 35, 36 of the iron shoe plate 31 to extend in a direction perpendicular to the mudhole (35, 36) and toward an outside of the support plate along the convex and concave portions thereof. Of course, a rubber block 50 is adhered by vulcanization to an outer face side of the support plate 42.

Figure 21:
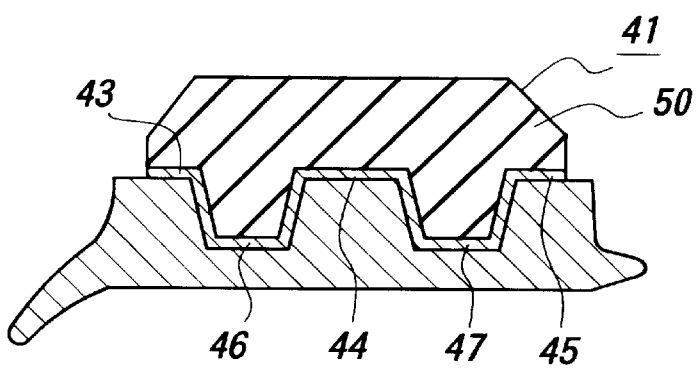
FIG. 21 is a diagrammatically section view taken along a line XXI—XXI in FIG. 18.
Figure 22:
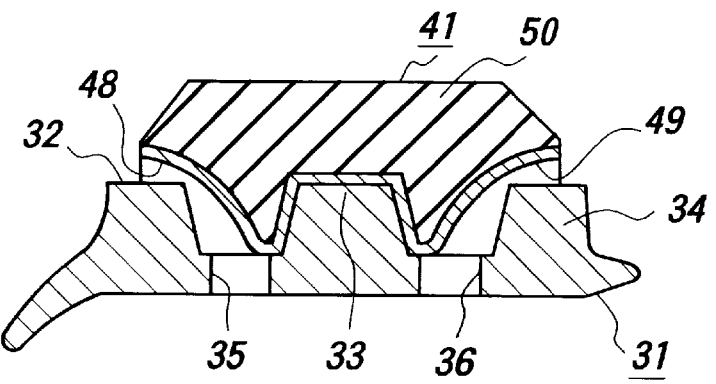
FIG. 22 is a diagrammatically section view taken along a line XXII—XXII in FIG. 18.

FIG. 21 is a section view taken along a line XXI—XXI in FIG. 18 and FIG. 22 is a section view taken along a line XXII—XXII in FIG. 18. As particularly seen from FIG. 22, the depression portions 48,49 communicate with the mudholes 35, 36 of the iron shoe plate 31 and extend in the direction perpendicular to the mudhole 35, 36 and toward the outside of the support plate to form mudholes for the support plate.

In the shoe pad 40 according to the invention, mud or small stones invaded from the mudholes 35, 36 of the iron shoe plate 31 are discharged from the depression portions 48, 49 toward the outside of the shoe pad 40, whereby the deformation of the support plate due to the invasion of mud or small stones can be prevented.

Figure 23:
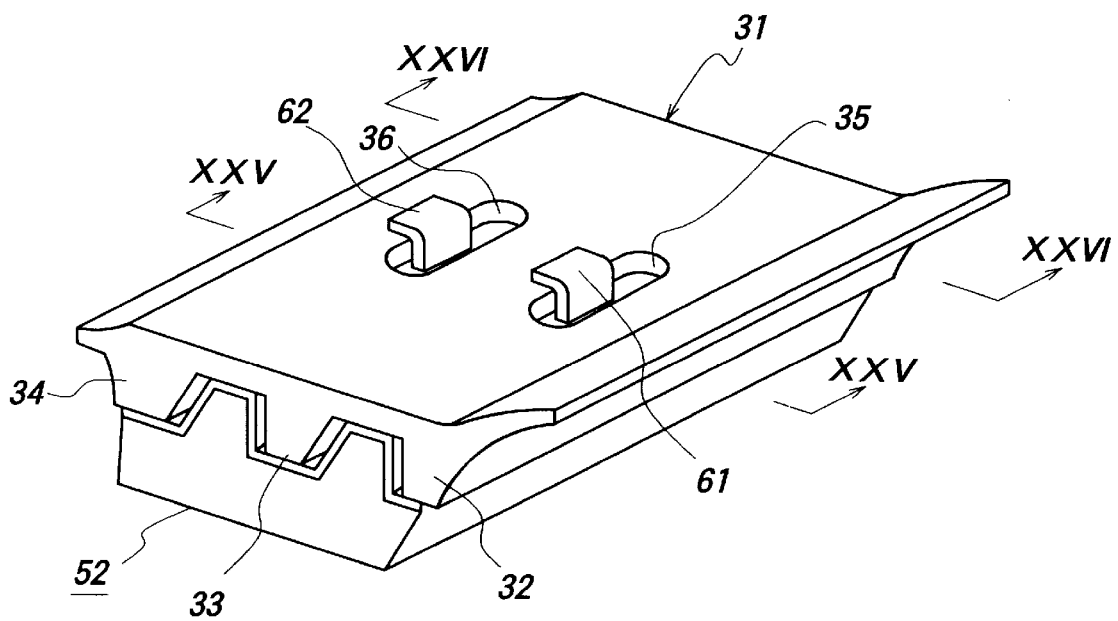
FIG. 23 is a perspective view of another embodiment of the elastic shoe used in the crawler according to the invention.
Figure 24:
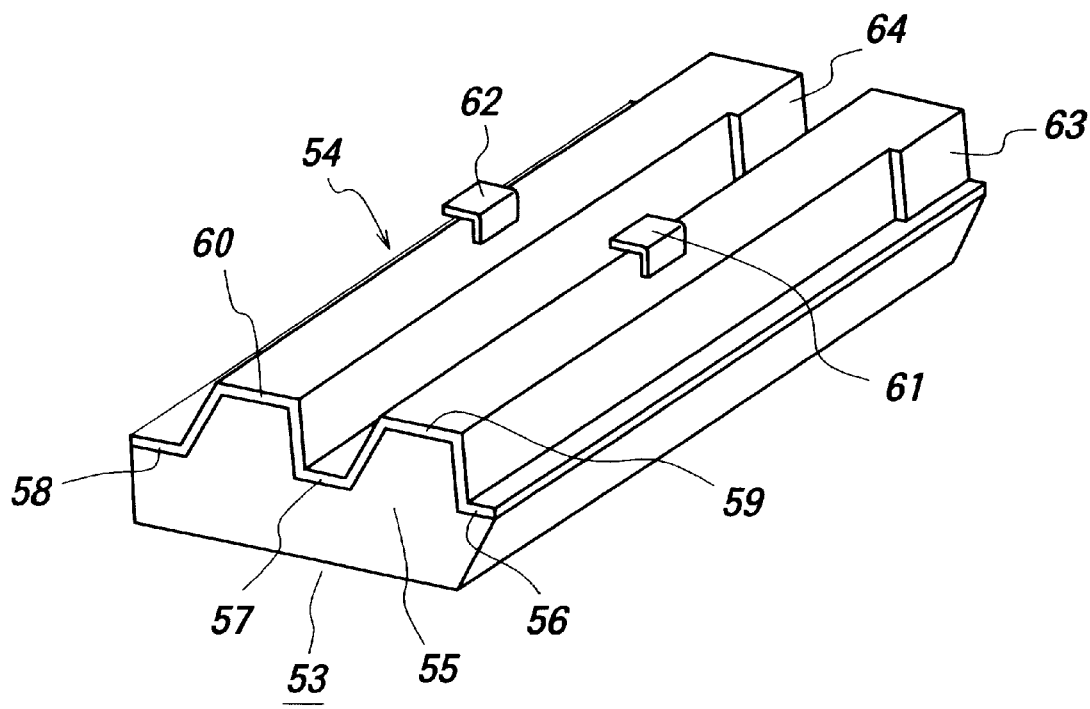
FIG. 24 is a perspective view illustrating only a rubber pad taken out from the elastic shoe shown in FIG. 23.

In FIG. 23 is shown the other embodiment of the shoe pad 52 according to the invention formed by applying the other embodiment of the rubber pad according to the invention to the iron shoe plate 31 shown in FIG. 17. FIG. 24 is a perspective view illustrating only the rubber pad 53 taken out from the shoe pad 52 of FIG. 23.

The rubber pad 53 comprises a support plate 54 and a rubber block 55 adhered by vulcanization thereto. The support plate 54 is provided with concave portions 56, 57, 58 at positions corresponding to the lug portions 32, 33, 34 of the iron shoe plate 31 and convex portions 59, 60 at positions corresponding to the valley portions of the iron shoe plate 31. Furthermore, hooking members 61, 62 are welded to the respective convex portions 59, 60 at positions corresponding to the mudholes 35, 36 formed in the iron shoe plate 31. In the illustrated embodiment, protruding portions 63, 64 are formed on the respective side faces of the convex portions 59, 60 in the vicinity of a longitudinal end of the support plate 54 in a direction opposite to an extending direction of a top of the hooking member 61, 62.

Figure 25:
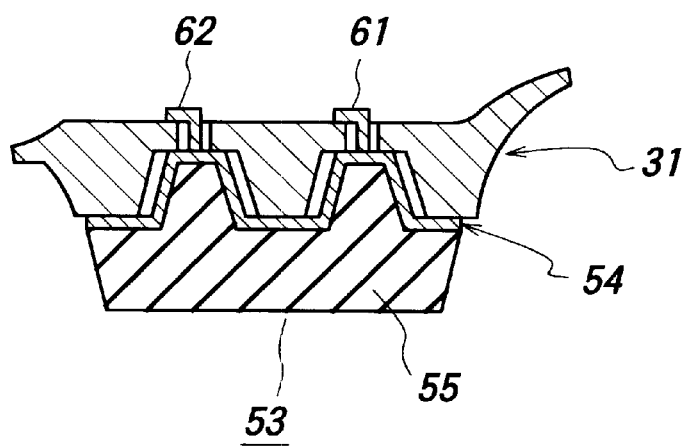
FIG. 25 is a diagrammatically section view taken along a line XXV—XXV in FIG. 23.
Figure 26:
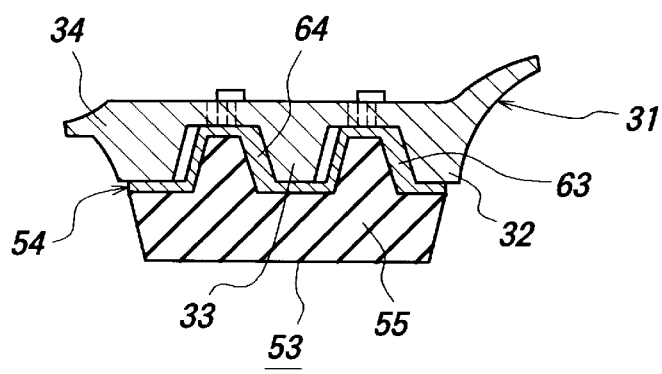
FIG. 26 is a diagrammatically section view taken along a line XXVI—XXVI in FIG. 23.

FIG. 25 is a section view taken along a line XXV—XXV in FIG. 23, and FIG. 26 is a section view taken along a line XXVI—XXVI in FIG. 23. In FIG. 25 is particularly shown a relation between the hooking member 61, 62 and the mudhole 35, 36, wherein the hooking member 61, 62 welded to the convex portion 59, 60 is inserted into the mudhole 35, 36 and fixed at an edge of the mudhole to the inner face of the iron shoe plate 31. Therefore, even if mud or small stones invade into the mudhole, the deformation of the support plate 54 due to the pushing force of mud or small stone invaded can sufficiently be prevented. In FIG. 26 is shown a relation between the protruding portion 63, 64 and the lug portion 32, 33, wherein the protruding portion 63, 64 is formed on the side face of the convex portion 59, 60 in the direction opposite to the extending direction of the hooking member 61, 62 to make the movable range of the convex portion 59, 60 of the support plate 54 between the lug portions 32, 33, 34 very small. As a result, the movement of the iron shoe plate 31 in front and back directions is substantially controlled by the synergistic action of the hooking member and the protruding portion.

In the formation of the protruding portion 63, 64, a width of the convex portion 59, 60 in the support plate 54 is made somewhat smaller than a distance between the lug portions 32, 33, 34 in the iron shoe plate 31 and the protruding portion is protruded from the side face of the convex portion by a gap defined between the lug portion and the convex portion.

Figure 27:
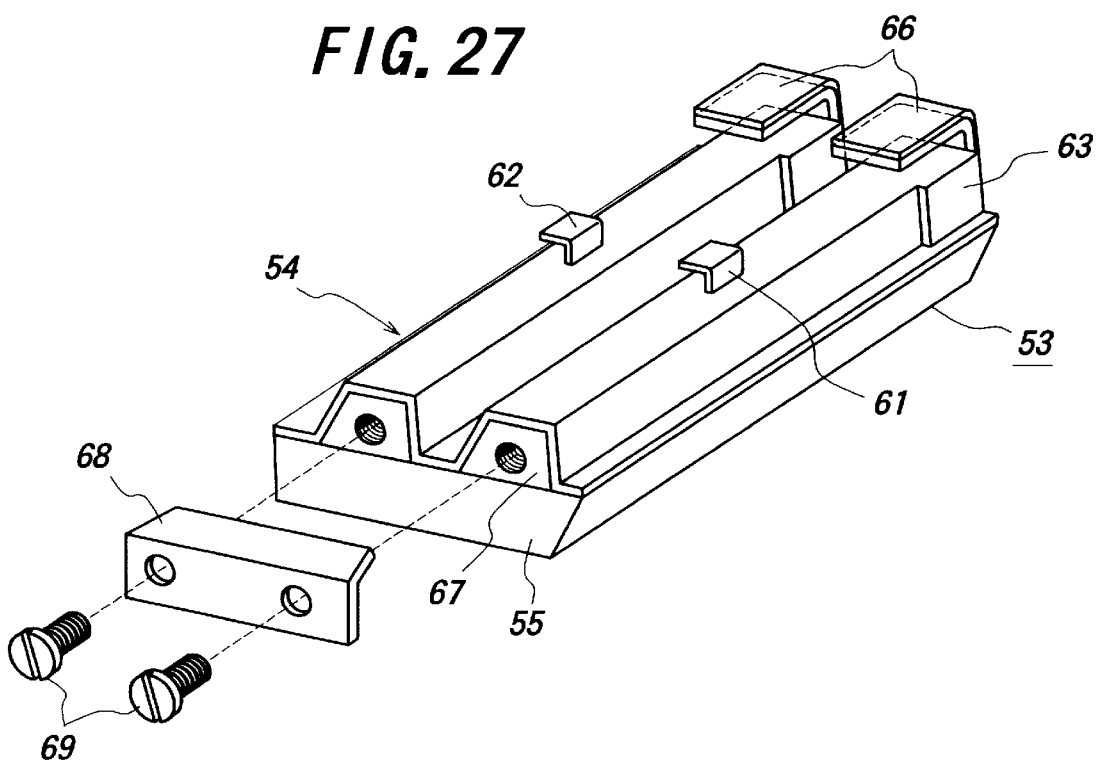
FIG. 27 is a perspective view of the other embodiment of the rubber pad according to the invention.

In the embodiment of FIGS. 23 to 26, the fixation between the iron shoe plate 31 and the rubber pad 52 is carried out by using bolts and nuts (not shown). As shown in FIG. 27, it is preferable to conduct the fixation of the rubber pad 53 to the iron shoe plate 31 by using a hook member 66 welded to each inner face of the convex portions 59, 60 located near to the protruding portions 63, 64, a female member 67 welded to the inner face of the convex portion located at a position opposite to the protruding portion, a fastening member 68 having a substantially L-shaped form and a male member 69 in the same manner as in the first embodiment of FIGS. 2 to 8.

Figure 28:
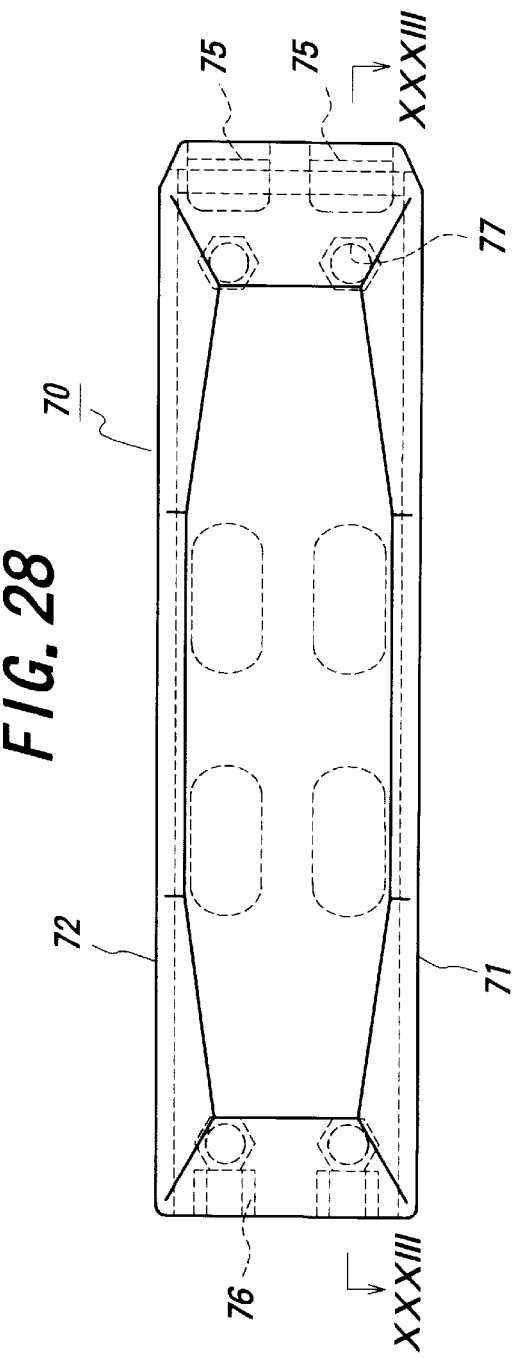
FIG. 28 is a plan view of the rubber pad shown in FIG. 27.
Figure 29:
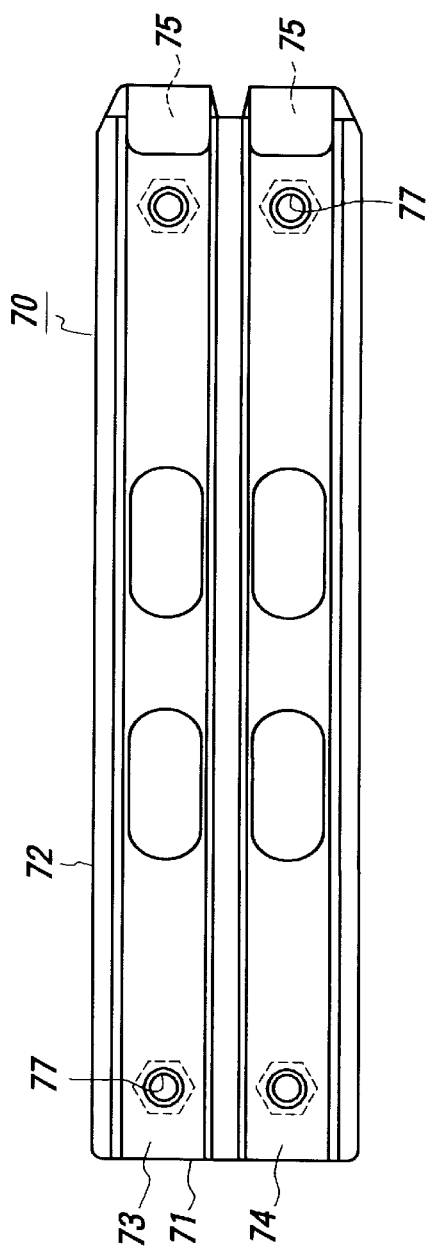
FIG. 29 is a bottom view of the rubber pad shown in FIG. 27.
Figure 30:
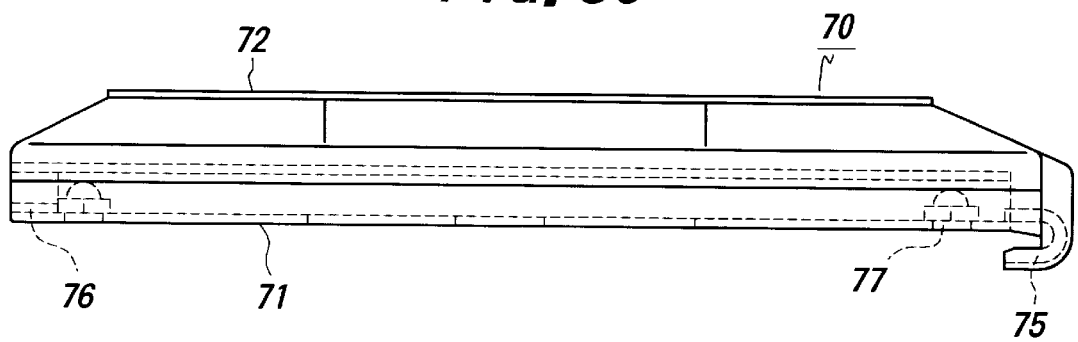
FIG. 30 is a front view of the rubber pad shown in FIG. 27.
Figure 31:
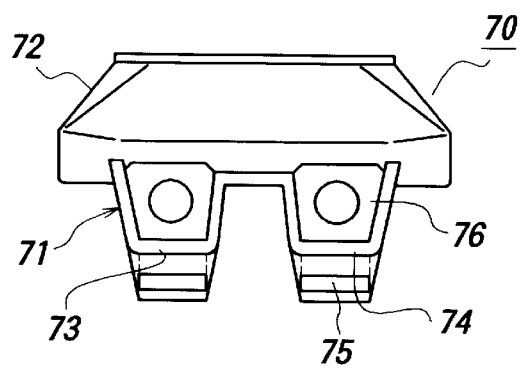
FIG. 31 is a left side view of the rubber pad shown in FIG. 27.
Figure 32:
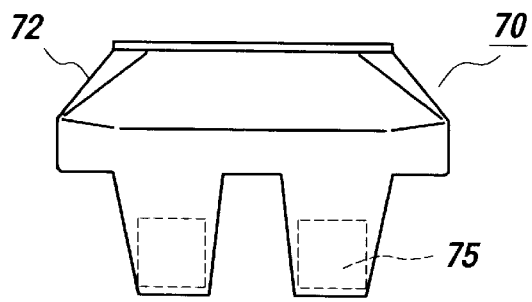
FIG. 32 is a right side view of the rubber pad shown in FIG. 27.

The other embodiment of the rubber pad (70) according to the invention is shown as a plan view in FIG. 28, as a bottom view in FIG. 29, as a front view in FIG. 30, as a left side view in FIG. 31 and as a right side view in FIG. 32, respectively.

The rubber pad 70 comprises a support plate 71 and a rubber block 72 adhered by vulcanization to the support plate 71. The support plate 71 has substantially the same shape as in an outer face of an iron shoe plate to be attached. That is, the support plate 71 is provided with two convex portions 73, 74 corresponding to valley portions defined between mutual lug portions of the iron shoe plate. A hook member 75 is welded to an inner face of the convex portion (73, 74) at its one end zone, while a female member 76 is welded to the inner face of the convex portion (73, 74) at the other end zone. Furthermore, two cap nuts 77 are welded to the inner face of the convex portion (73, 74) at positions located in the vicinity of the hook member 75 and the female member 76. The hook member, female member and cap nut all embedded in the rubber block 72. Moreover, the position of the cap nut 77 corresponds to a position of a bolt hole formed in the iron shoe plate.

In the rubber pad 70 according to the invention, the attachment of the rubber pad to the iron shoe plate is possible either from a lateral direction of a machine body utilizing the hook member 75 and the female member 76 or from an inside of the machine body utilizing the cap nut 77 or both. Therefore, the rubber pad 70 is applicable to any structures of the shoe pad. Furthermore, the attachment can be made more secure by using all attaching mechanisms.

Figure 33:
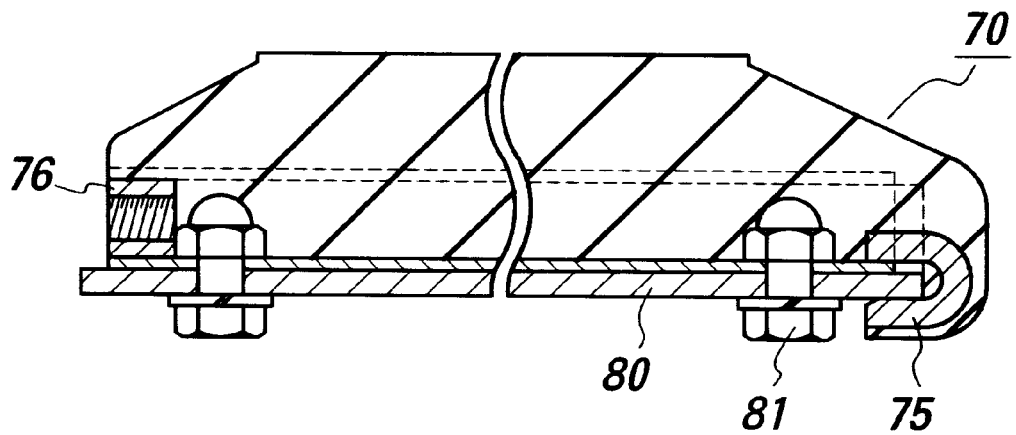
FIG. 33 is a diagrammatically foreshortened section view taken along a line XXXIII—XXXIII in FIG. 28.
Figure 34:
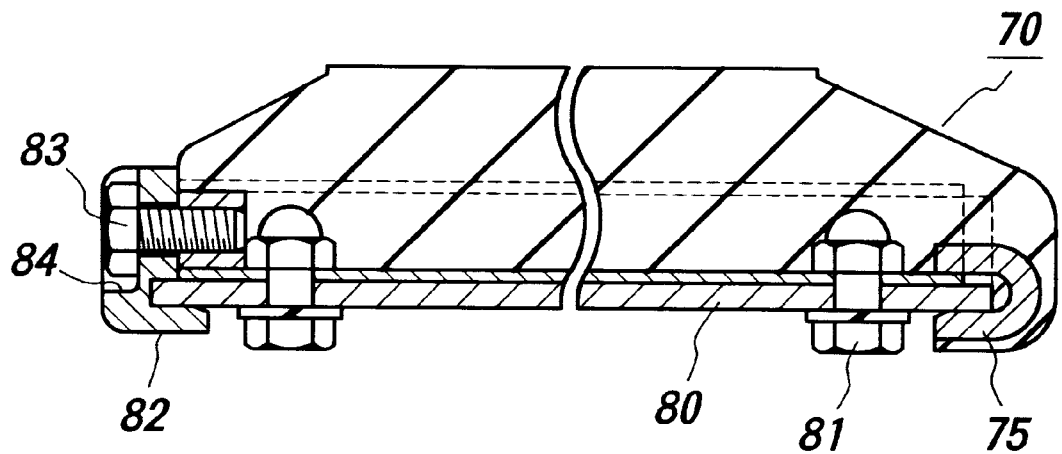
FIG. 34 is a diagrammatically foreshortened section view of another embodiment of the rubber pad according to the invention.

FIG. 33 is a section view illustrating the attachment of the rubber pad 70 to an iron plate 80 through bolts 81 screwed into the cap nuts 77. In this case, the iron shoe plate 80 is provided on its outer face with three lug portions and valley portions defined between the mutual lug portions. The valley portion is provided with two bolt holes corresponding to the positions of the cap nuts welded to the support plate 70. After the hook member 75 of the rubber pad 70 is engaged with an end portion of the iron shoe plate 80, a bolt 81 is inserted into the bolt hole of the iron shoe plate and screwed into the cap nut 77, whereby the rubber pad 70 is sufficiently secured to the iron shoe plate 80.

FIG. 33 is a section view illustrating the attachment of the rubber pad 70 to the iron shoe plate 80 by utilizing the hooking member 85, cap nuts 77 and female member 76. In this case, the hook member 75 is first engaged with an end portion of the iron shoe plate 80, and then the bolts 81 are screwed into the respective cap nuts 77 and further a fastening member 82 having a substantially L-shaped form is contacted with the other end face of the rubber pad 70 so as to sandwich the iron shoe plate 80 between the rubber pad and the fastening member and a bolt 83 is screwed through a bolt hole formed in the fastening member into the female member 76, whereby the rubber pad 70 can more surely be secured to the iron shoe plate 80. Moreover, a counterboring portion 84 is formed in the fastening member 82 so as to surely protect a head of the bolt 83, whereby the replacement of the rubber pad can more easily be conducted.

What is claimed is:

1. A rubber composite pad that is joined to an iron shoe plate, said rubbercomposite pad comprising; a support plate having the same shape as an outer surface of that portion of said iron shoe plate which is provided with lugs including side lugs, a rubber block vulcanized and adhered to the support plate and having the same shape as an outer surface of the iron shoe plate that extends over both side lugs thereof, a coupling member fixed to at least one side face of the support plate, an idle hole formed on a side face of the rubber block at a position corresponding to the coupling member, a hook member fixed to the support plate at a position opposite to the coupling member and provided with a flange extending toward an inner face of the iron shoe plate, and a fastening member positioned at said at least one side face of the rubber composite pad to secure the iron shoe plate to said rubber composite pad through said coupling member.

2. A rubber composite pad according to claim 1, wherein the fastening member is provided with a counterboring portion for the member.

3. A composite rubber pad according to claim 1, wherein the fastening member is provided with a flange having a length to engage with the inner face of the iron shoe plate.

4. A composite rubber pad according to claim 1, wherein a part of an engaging portion of the hook member with one end portion of the iron shoe plate is coated with a rubbery elastomer.

5. A composite rubber pad according to claim 4, wherein a thickness of the rubbery elastomer increases toward an engaging end of the hook member.

6. A rubber composite pad that is joined to an iron shoe plate, said rubber composite pad comprising; a support plate having the same shape as an outer surface of that portion of said iron shoe plate which is provided with lugs including side lugs and a mudhole formed in a portion between the lugs, a rubber block vulcanized and adhered to the support plate and having the same shape as an outer surface of the iron shoe plate and extends over both side lugs thereof, in which a recess portion in fluid communication with the mudhole formed in the support plate to extend in a direction perpendicular to the mudhole and toward the outside of the support plate.

7. A rubber composite pad that is joined to an iron shoe plate, said rubber composite pad comprising; a support plate having a convex portion and a surface with the same shape as an outer surface of that portion of said iron shoe plate which is provided with lugs including side lugs and a mudhole formed in a portion of said support plate between the lugs, a rubber block vulcanized and adhered to the support plate and having the same shape as an outer surface of the iron shoe plate that extends over both side lugs thereof, a hooking member is secured to said convex portion of the support plate at a position corresponding to the location of the mudhole to engage with an edge portion of the mudhole.

8. A composite rubber pad according to claim 7, wherein a protruding portion is formed on a side face of the convex portion of the support plate in a direction opposite to an extending direction of a top of the hooking member.

9. A rubber composite pad that is joined to an iron shoe plate, said rubber composite pad comprising; a support plate having the same shape as an outer surface of that portion of said iron shoe plate which provided with lugs including side lugs, a rubber block vulcanized and adhered to the support plate and having the same shape as an outer surface of the iron shoe plate that extends over both side lugs thereof, cap nuts welded to the iron shoe plate at given positions and embedded in the rubber block, a coupling member fixed to an end of the support plate, a hook member fixed to another end of the support plate provided with a flange extending toward an inner face of the iron shoe plate, and a fastening member securing the rubber block to the iron shoe plate by engagement with said cap nuts.

* * * * *